US011159290B2

(12) United States Patent
Lo et al.

(10) Patent No.: US 11,159,290 B2
(45) Date of Patent: Oct. 26, 2021

(54) DEVICE AND METHOD FOR HANDLING A SOUNDING REFERENCE SIGNAL TRANSMISSION

(71) Applicant: ACER INCORPORATED, New Taipei (TW)

(72) Inventors: Li-Chung Lo, New Taipei (TW); Chien-Min Lee, New Taipei (TW); Tsung-Hua Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/454,068

(22) Filed: Jun. 27, 2019

(65) Prior Publication Data
US 2020/0007289 A1  Jan. 2, 2020

Related U.S. Application Data

(60) Provisional application No. 62/691,007, filed on Jun. 28, 2018.

(51) Int. Cl.
*H04L 5/00* (2006.01)

(52) U.S. Cl.
CPC .......... *H04L 5/0048* (2013.01); *H04L 5/0053* (2013.01); *H04L 5/0082* (2013.01); *H04L 5/0005* (2013.01)

(58) Field of Classification Search
CPC ... H04L 5/0048; H04L 5/0005; H04L 5/0082; H04L 5/0053

(Continued)

(56) References Cited

U.S. PATENT DOCUMENTS

2013/0028109 A1* 1/2013 Jongren ............ H04W 72/1226
                                                          370/252
2015/0326287 A1* 11/2015 Kazmi ................ H04W 52/281
                                                          375/267

(Continued)

FOREIGN PATENT DOCUMENTS

WO   2018/056789 A1   3/2018
WO   2018/097947 A2   5/2018

OTHER PUBLICATIONS

Qualcomm Incorporated, Discussion on Hybrid CSI-RS based Operation for eFD-MIMO, 3GPP TSG-RAN WG1 #84bis, Apr. 11-15, 2016, Busan, Korea, p. 1/1-3/1, R1-163042, XP051080486.

(Continued)

*Primary Examiner* — Faisal Choudhury
(74) *Attorney, Agent, or Firm* — McClure, Qualey & Rodack, LLP

(57) ABSTRACT

A communication device for handling a sounding reference signal (SRS) transmission comprises at least one storage device; and at least one processing circuit, coupled to the at least one storage device. The at least one storage device stores instructions, and the at least one processing circuit is configured to execute the instructions of: determining at least one uplink (UL) beamforming weight of at least one SRS according to at least one of a first channel state information reference signal (CSI-RS) or a second CSI-RS, wherein the first CSI-RS is for determining the at least one UL beamforming weight and the second CSI-RS is for a channel interference measurement for the at least one SRS; and transmitting the at least one SRS with the at least one UL beamforming weight to a network according to a beamforming.

11 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0029239 | A1* | 1/2016 | Sadeghi | H04W 24/10 |
| | | | | 370/252 |
| 2017/0324455 | A1* | 11/2017 | Soriaga | H04B 7/0691 |
| 2018/0062724 | A1 | 3/2018 | Onggosanusi | |
| 2018/0287757 | A1* | 10/2018 | Onggosanusi | H04L 5/0053 |
| 2019/0379502 | A1* | 12/2019 | Kakishima | H04B 7/0619 |
| 2020/0037258 | A1* | 1/2020 | Tang | H04L 5/0051 |
| 2020/0228232 | A1* | 7/2020 | Lyashev | H04B 7/0417 |

OTHER PUBLICATIONS

Samsung, Discussion on UL beam management, 3GPP TSG RAN WG1 Meeting #90, Prague, Czech, Aug. 21-25, 2017, R1-1713596, XP051316396.

* cited by examiner

DEVICE AND METHOD FOR HANDLING A
SOUNDING REFERENCE SIGNAL
TRANSMISSION

CROSS REFERENCE TO RELATED
APPLICATIONS

This application claims the benefit of U.S. Provisional Application No. 62/691,007 filed on Jun. 28, 2018, which is incorporated herein by reference.

BACKGROUND OF THE INVENTION

1. Field of the Invention

The present invention relates to a device and a method used in a wireless communication system, and more particularly, to a device and a method of handling a sounding reference signal transmission.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

The eNB may communicate with multiple UEs simultaneously while operating a beamforming, e.g., a UL multi-user multiple-input multiple-output (MU-MIMO) is operated. The UE determines a precoder for the UL MU-MIMO to communicate with the eNB. However, the UE does not consider an inter-user interference related to other UEs when determining the precoder, and the inter-user interference is caused to the other UEs when communicating with the eNB. Benefit of the UL MU-MIMO is degraded. Thus, it is important to solve the problem of the inter-user interference when operating the UL MU-MIMO.

SUMMARY OF THE INVENTION

The present invention therefore provides a device and a method for handling a sounding reference signal (SRS) transmission to solve the abovementioned problem.

A communication device for handling a sounding reference signal (SRS) transmission comprises at least one storage device; and at least one processing circuit, coupled to the at least one storage device. The at least one storage device stores instructions, and the at least one processing circuit is configured to execute the instructions of: determining at least one uplink (UL) beamforming weight of at least one SRS according to at least one of a first channel state information reference signal (CSI-RS) or a second CSI-RS, wherein the first CSI-RS is for determining the at least one UL beamforming weight and the second CSI-RS is for a channel interference measurement for the at least one SRS; and transmitting the at least one SRS with the at least one UL beamforming weight to a network according to a beamforming.

A communication device for handling a sounding reference signal (SRS) transmission comprises at least one storage device; and at least one processing circuit, coupled to the at least one storage device. The at least one storage device stores instructions, and the at least one processing circuit is configured to execute the instructions of: receiving an indicator from a network; determining a precoder according to at least one of the indicator or a channel state information reference signal (CSI-RS); and performing a uplink (UL) transmission to the network according to the precoder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
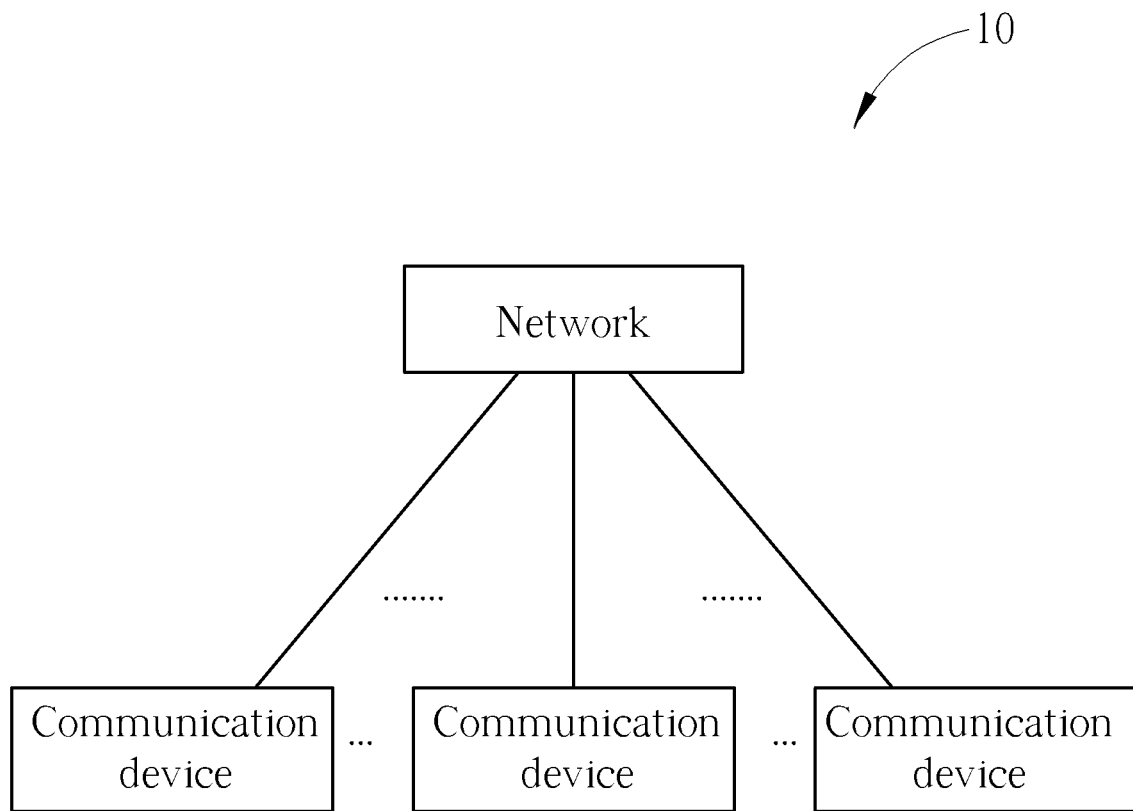
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
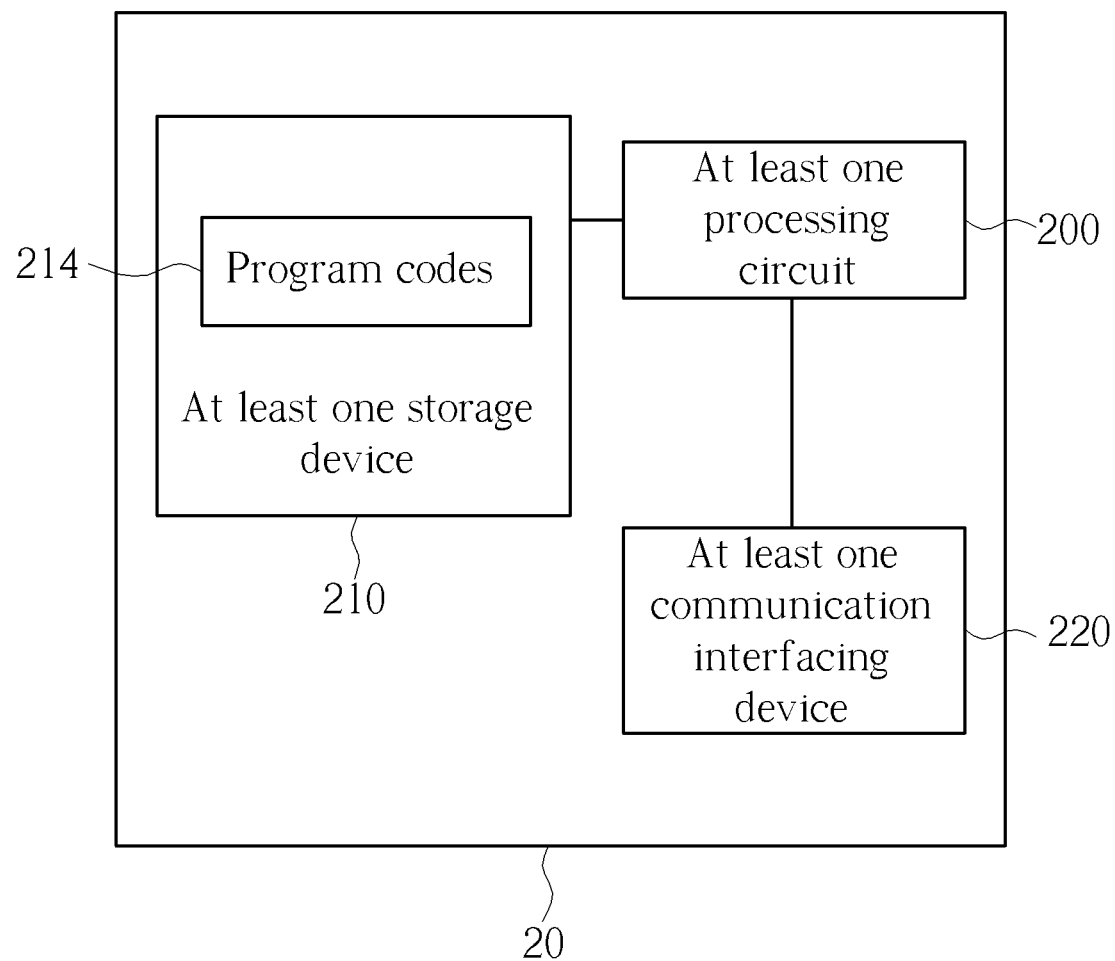
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In a scenario, a communication device may determine a precoder according to only one channel state information reference signal (CSI-RS) without considering an inter-user interference. Accordingly, it is difficult for a gNB to schedule UL multi-user multiple-input multiple-output (MU-MIMO) (e.g., performing a UE pairing, deciding a proper modulation and coding scheme (MCS) level, etc.) without any additional information.

Figure 3:
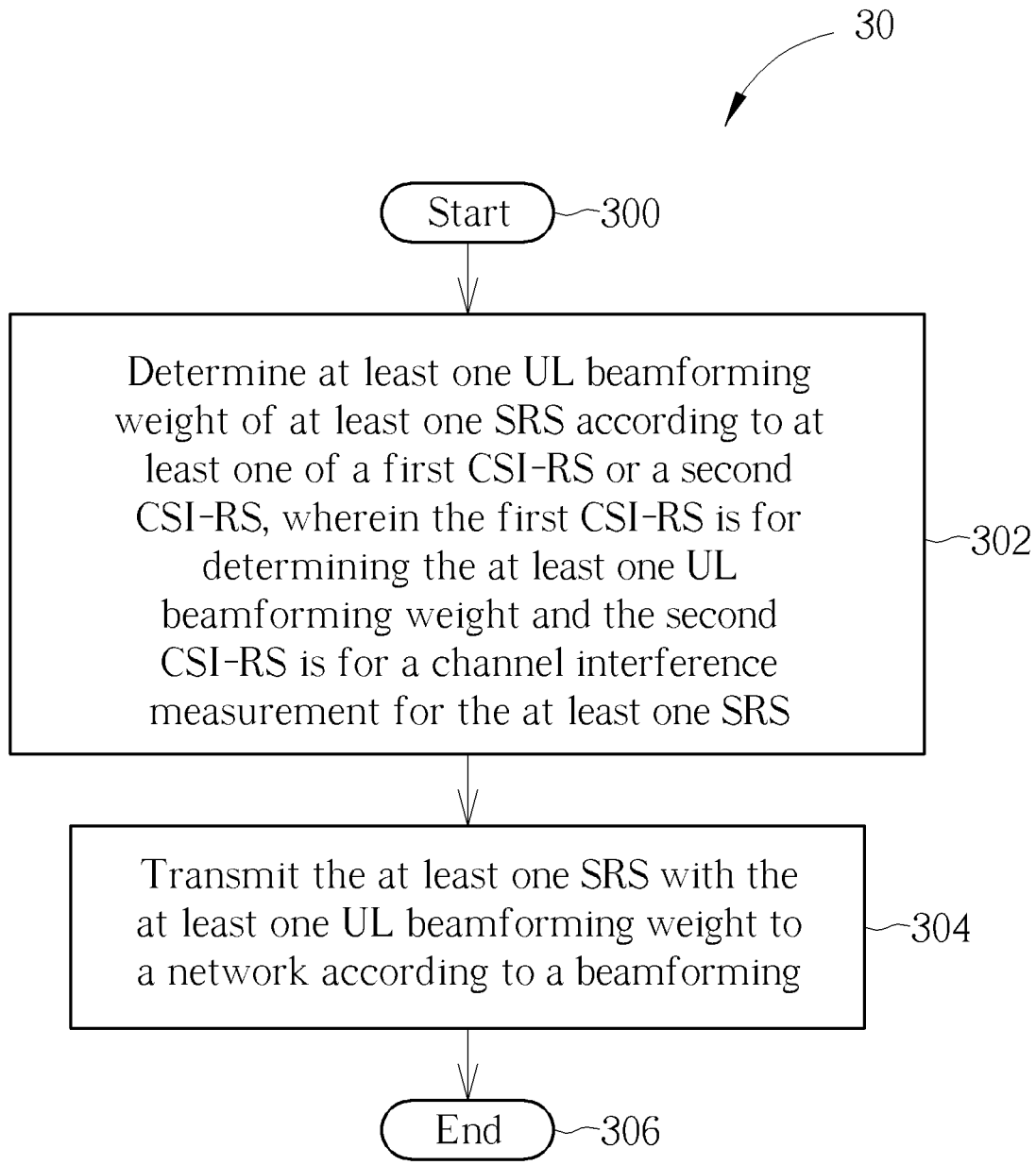
FIG. 3 is a flowchart of a process according to an example of the present invention.

FIG. 3 is a flowchart of a process 30 according to an example of the present invention. The process 30 may be utilized in a communication device, to handle a sounding reference signal (SRS) transmission. The process 30 may be compiled into the program codes 214 and includes the following steps:

Step 300: Start.

Step 302: Determine at least one UL beamforming weight of at least one SRS according to at least one of a first channel state information reference signal (CSI-RS) or a second CSI-RS, wherein the first CSI-RS is for determining the at least one UL beamforming weight and the second CSI-RS is for a channel interference measurement for the at least one SRS.

Step 304: Transmit the at least one SRS with the at least one UL beamforming weight to a network according to a beamforming.

Step 306: End.

According to the process 30, the communication device determines (e.g., calculates, obtains, selects and/or generates) at least one UL beamforming weight (e.g., UL beamforming weight, precoder or spatial domain Tx filter) of at least one SRS according to at least one of a first CSI-RS or a second CSI-RS, wherein the first CSI-RS is for determining the at least one UL beamforming weight and the second CSI-RS is for a channel interference measurement for the at least one SRS. The communication device transmits the at least one SRS with the at least one UL beamforming weight to a network according to a beamforming (e.g., UL multi-user multiple-input multiple-output (MU-MIMO)). That is, the at least one UL beamforming weight is determined according to the channel interference measurement, to reduce an interference (e.g., inter-user interference) caused by the communication device to at least one other communication device. Thus, performance of the UL MU-MIMO is improved.

Realization of the process 30 is not limited to the above description. The following examples may be applied for realizing the process 30.

In one example, the at least one SRS is configured by a SRS configuration received from the network, and the SRS configuration comprises the at least one of the first CSI-RS or the second CSI-RS. In one example, the SRS configuration comprises a plurality of trigger states. In one example, the communication device receives the at least one of the first CSI-RS or the second CSI-RS according to a UL RS request related configuration, from the network.

In one example, the at least one SRS is determined according to a signaling indicating one of a plurality of trigger states. In one example, the signaling is a SRS request in a UL grant DL control information (DCI). In one example, the communication device performs a UL transmission to the network according to the UL grant DCI. In one example, the UL transmission includes at least one of a PUCCH or a PUSCH. In one example, the plurality of trigger states includes at least one of no SRS transmission, determining the at least one UL beamforming weight according to the first CSI-RS, or determining the at least one UL beamforming weight according to the first CSI-RS and the second CSI-RS. That is, all or part of the three operations may be included in the trigger states.

In one example, the at least one SRS is at least one periodic SRS or at least one aperiodic SRS. In one example, the first CSI-RS or the second CSI-RS is indicated by a higher layer configuration or a field in a SRS request. In one example, the first CSI-RS or the second CSI-RS is selected by a medium access control (MAC) control element (CE).

In one example, the SRS configuration includes at least one of a time resource or a frequency resource for transmitting the at least one SRS. In one example, the SRS configuration includes a periodicity for transmitting the at least one SRS. In one example, the channel interference suppression is for suppressing an interference from the communication device to at least one other communication device.

In one example, the communication device measures at least one DL channel according to the at least one of the first CSI-RS or the second CSI-RS. Then, the communication device determines the at least one UL beamforming weight according to the SRS configuration, the UL RS request related configuration, the at least one DL channel and the SRS request. In one example, the communication device operates in a time-division duplexing (TDD) mode. That is, the communication device performs the process 30 and the above examples in the TDD mode.

Figure 4:
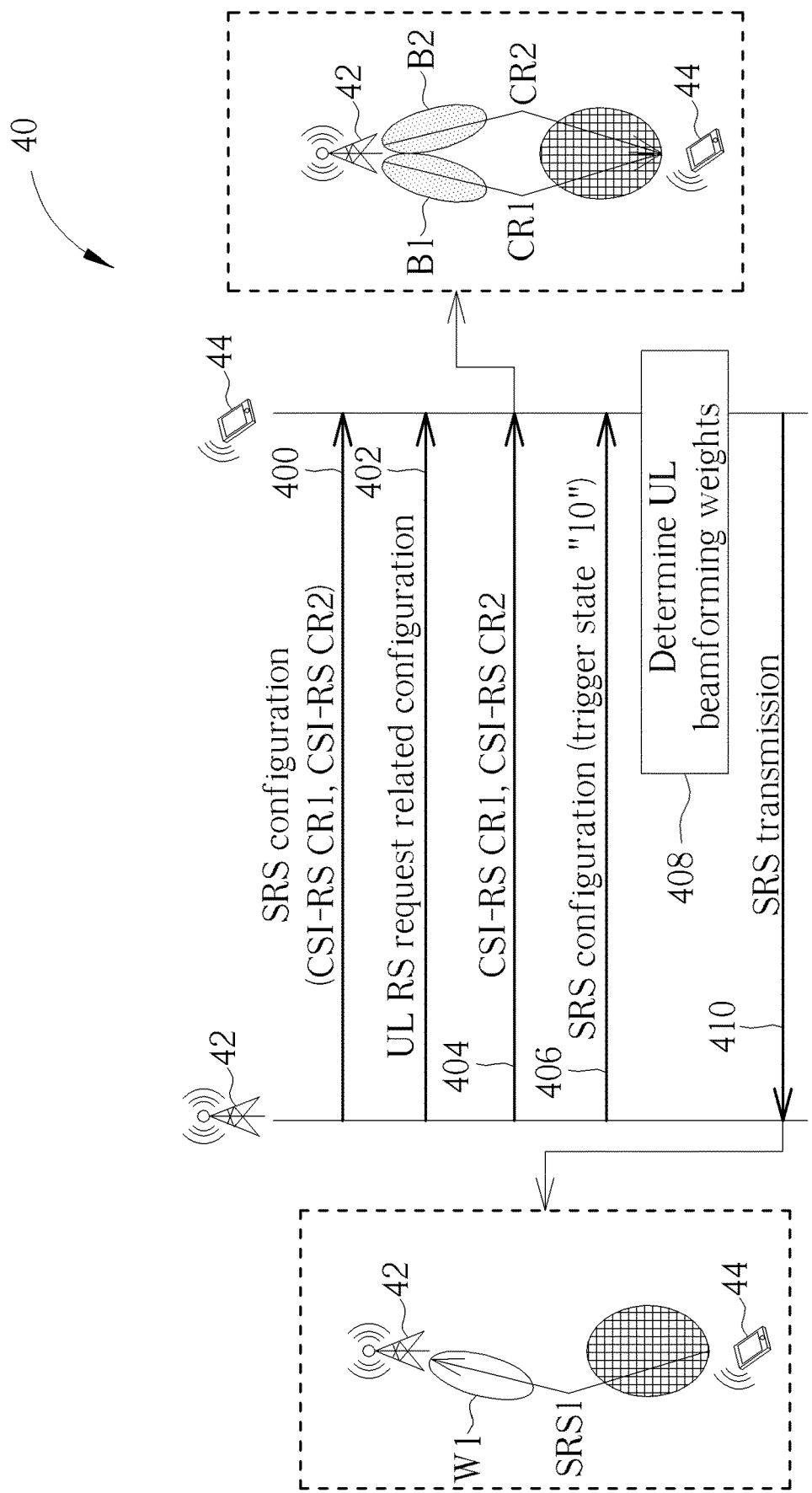
FIG. 4 is a flowchart of a process according to an example of the present invention.

FIG. 4 is a flowchart of a process 40 according to an example of the present invention. A gNB 42 communicates with a communication device 44 according to a beamforming. The gNB 42 transmits a SRS configuration including CSI-RSs CR1-CR2 (e.g., including IDs of the CSI-RSs CR1-CR2) to the communication device 44 (Step 400). The CRS-RS CR1 may be for determining a UL beamforming weight W1 for a SRS SRS1, and the CRS-RS CR2 may be for a channel interference suppression on the SRS SRS1. The gNB 42 transmits a SRS UL request related configuration including 3 trigger states labeled with "00", "01" and "10" to the communication device 44 (Step 402). The trigger states "00", "01" and "10" indicate "no SRS transmission", "determining the UL beamforming weight W1 according to the CSI-RS CR1" and "determining the UL beamforming weight W1 according to the CSI-RSs CR1-CR2", respectively, as described previously. The gNB 42 transmits the CSI-RSs CR1-CR2 to the communication device 44 according to the UL RS request related configuration (Step 404). In the present example, the gNB 42 transmits the CSI-RSs CR1-CR2 via beams B1-B2, respectively.

The gNB 42 transmits a SRS request indicating the trigger state "10" to the communication device 44 (Step 406). That is, the communication device 44 is indicated to consider the channel interference suppression when transmitting the SRSSRS1. The communication device 44 determines the UL beamforming weight W1 according to the SRS configuration, the UL RS request related configuration, the CSI-RSs CR1-CR2 and the SRS request (Step 408). Then, the communication device 44 transmits the SRS SRS1 with the UL beamforming weight W1 according to the beamforming (Step 410). In the present example, the SRS SRS1 is suppressed according to the UL beamforming weight W1 due to the consideration of the channel interference suppression.

In one example, the SRS configuration (e.g., radio resource control (RRC) signaling, MAC CE) in FIG. 4 may include at least one of following information:

(1) At least one first candidate DL RS (e.g., CSI-RS, SSB), e.g., for determining a beamforming weight (or precoder).

(2) At least one second candidate DL RS (e.g., CSI-RS, SSB), e.g., for determining the beamforming weight, wherein the at least one second candidate DL RS may be a subset of the at least one first candidate DL RS.

(3) At least one third candidate DL RS (e.g., CSI-RS, SSB), e.g., for a channel interference suppression or an interference measurement)

(4) At least one fourth candidate DL RS (e.g., CSI-RS, SSB), e.g., for the channel interference suppression or the interference measurement, wherein the at least one fourth candidate DL RS may be a subset of the at least one third candidate DL RS.

(5) Time/frequency resource of at least one UL RS (e.g., SRS).

(6) A Periodicity of the at least one UL RS.

In one example, the SRS configuration (e.g., RRC signal, MAC CE) in FIG. 4 may include at least one of following information:

(1) A first candidate DL RS set (including at least one first candidate DL RS) and a third candidate DL RS set (includes at least one third candidate DL RS) may be configured by a RRC signaling.

(2) A second candidate DL RS set (including at least one second candidate DL RS) and a fourth candidate DL RS set (includes at least one fourth candidate DL RS) may be configured by a MAC layer signaling, if any.

In one example, the SRS configuration (e.g., RRC signal, MAC CE) in FIG. 4 may include at least one of following information:

(1) A first candidate DL RS set (including at least one first candidate DL RS) may be configured by a RRC signaling.

(2) A second candidate DL RS set (including at least one second candidate DL RS) may be configured by a MAC layer signaling, if any.

In one example, the UL RS request related configuration in FIG. 4 may include at least one of following information:

(1) A first candidate DL RS set (including at least one first candidate DL RS) and a third candidate DL RS set (includes at least one third candidate DL RS) may be configured by a RRC signaling.

(2) A first selected DL RS set (including at least one first selected DL RS) and a second selected DL RS set (includes at least one second selected DL RS) may be configured by a MAC layer signaling.

In one example, the UL RS request related configuration in FIG. 4 may include at least one of following information:

(1) A first candidate DL RS set (including at least one first candidate DL RS) may be configured by a RRC signaling.

(2) A first selected DL RS set (including at least one first selected DL RS) may be configured by a MAC layer signaling.

In one example, the UL RS request related configuration in FIG. 4 may include at least one of following information:

A first selected DL RS set (including at least one first selected DL RS) and a second selected DL RS set (includes at least one second selected DL RS) may be configured by a RRC signaling.

Figure 5:
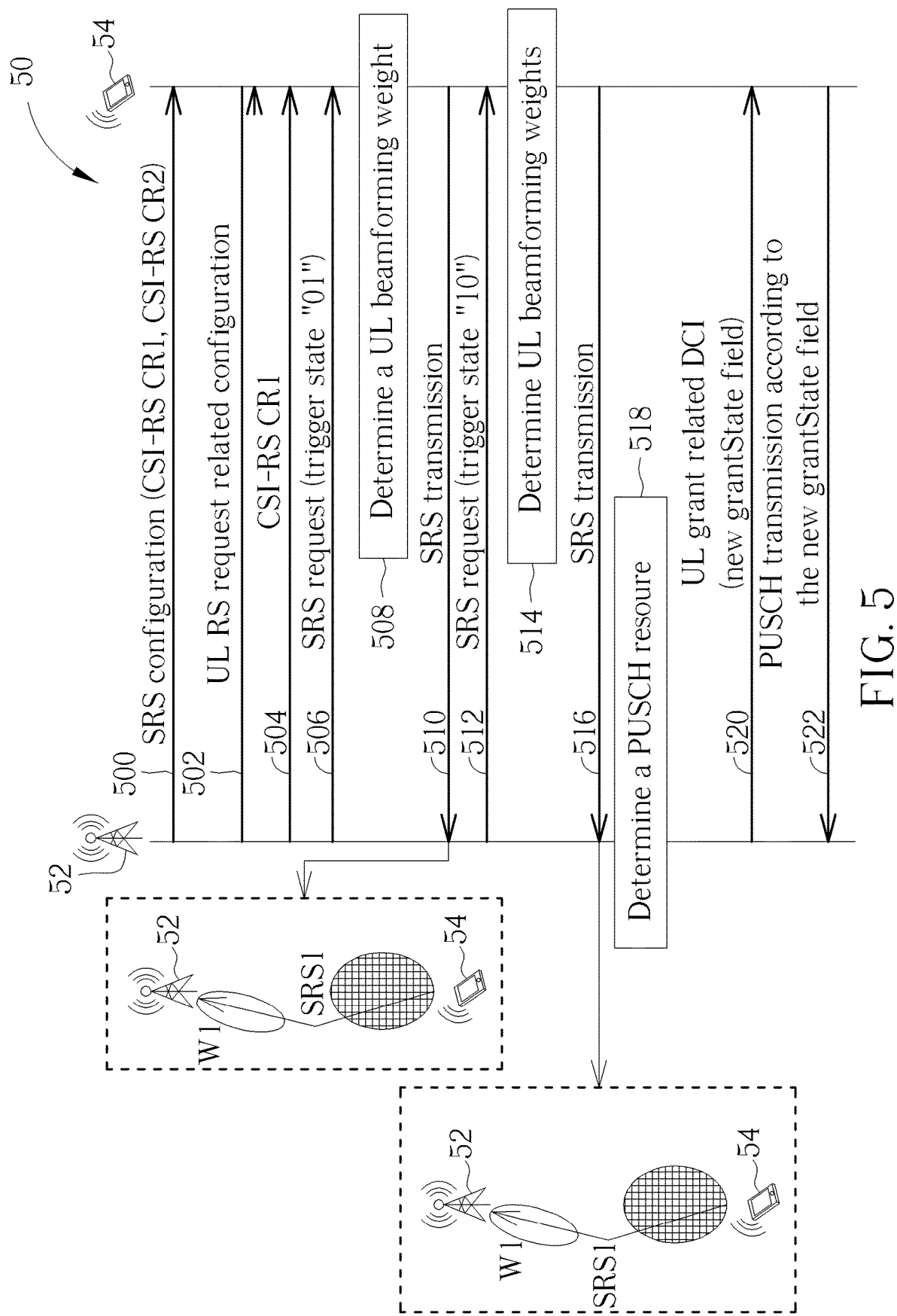
FIG. 5 is a flowchart of a process according to an example of the present invention.

FIG. 5 is a flowchart of a process 50 according to an example of the present invention. A gNB 52 communicates with a communication device 54 according to a beamforming. The gNB 52 transmits a SRS configuration including CSI-RSs CR1-CR2 (e.g., including IDs of the CSI-RSs CR1-CR2) to the communication device 54 (Step 500). The CRS-RS CR1 may be for determining a UL beamforming weight W1 for a SRS SRS1, and The CRS-RS CR2 may be for a channel interference suppression to the SRSSRS1. The gNB 52 transmits a SRS UL request related configuration including 3 trigger states labeled with "00", "01" and "10" to the communication device 54 (Step 502). The trigger states "00", "01" and "10" indicate "no SRS transmission", "determining the UL beamforming weight W1 according to the CSI-RS CR1" and "determining the UL beamforming weight W1 according to the CSI-RSs CR1-CR2", respectively, as described previously. The gNB 52 transmits the CSI-RS CR1 to the communication device 54 according to the UL RS request related configuration (Step 504). In the present example, the gNB 52 transmits the CSI-RS CR1 via a beam.

The gNB 52 transmits a SRS request indicating the trigger state "01" to the communication device 54 (Step 506). That is, the channel interference suppression is not indicated. The communication device 54 determines the UL beamforming weight W1 according to the SRS configuration, the UL RS request related configuration, the CSI-RS CR1 and the SRS request (Step 508). Then, the communication device 54 transmits the SRS SRS1 with the UL beamforming weight W1 according to the beamforming (Step 510). In the present example, the channel interference suppression is no considered.

The gNB 52 transmits a SRS request indicating the trigger state "10" to the communication device 54 (Step 510). That is, the communication device 54 is indicated to consider the channel interference suppression when transmitting the SRSSRS1. The communication device 54 determines the UL beamforming weight W1 according to the SRS configuration, the UL RS request related configuration, the CSI-RSs CR1-CR2 and the SRS request (Step 514). Then, the communication device 54 transmits the SRS SRS1 with the UL beamforming weight W1 according to the beamforming (Step 516). In the present example, the SRS SRS1 is suppressed (e.g., transmitted with a reduced power level) or cancelled according to the UL beamforming weight W1 due to the consideration of the channel interference suppression.

The gNB 52 determines a PUSCH resource according to the SRSs SRS1-SRS2 (Step 518). The gNB 52 transmits a UL grant DCI including a grant state (e.g., a new grantState field) to the communication device 54 (Step 520). Then, the communication device 54 transmits a PUSCH via the PUSCH resource according to the UL grant DCI (Step 522).

In one example, the grantState field "01" indicates a PUSCH transmission performed according to a trigger state "01" and/or the CSI-RS CR1. In one example, the grantState field "10" indicates a PUSCH transmission performed according to a trigger state "10" and/or the CSI-RSs CR1-CR2.

Figure 6:
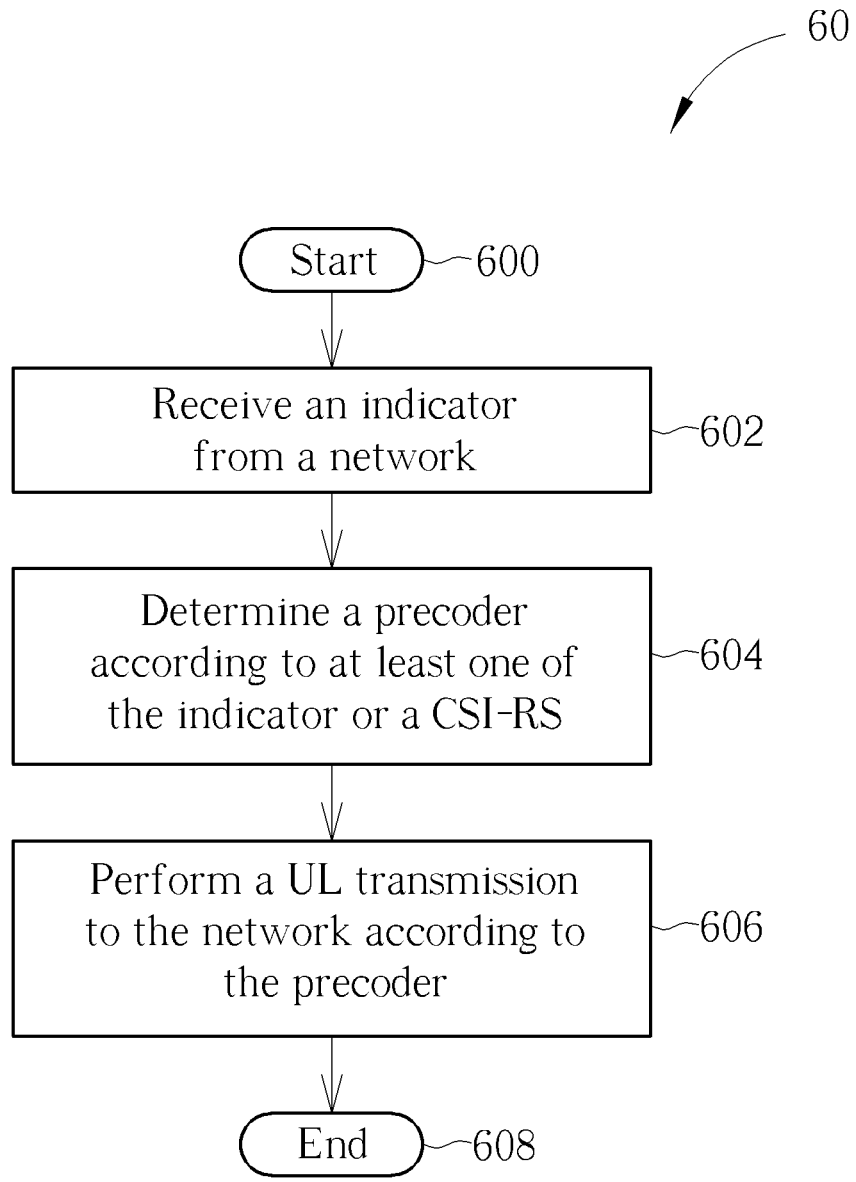
FIG. 6 is a flowchart of a process according to an example of the present invention.

FIG. 6 is a flowchart of a process 60 according to an example of the present invention. The process 60 may be utilized in a communication device, to handle a SRS transmission. The process 60 may be compiled into the program codes 214 and includes the following steps:

Step 600: Start.

Step 602: Receive an indicator from a network.

Step 604: Determine a precoder according to at least one of the indicator or a CSI-RS.

Step 606: Perform a UL transmission to the network according to the precoder.

Step 608: End.

According to the process 60, the communication device receives an indicator from a network. The communication device receives a CSI-RS from the network. The communication device determines a precoder according to at least one of the indicator or a CSI-RS. Then, the communication device Perform a UL transmission to the network according to the precoder. Thus, performance of the UL MU-MIMO is improved.

Realization of the process 60 is not limited to the above description. The following examples may be applied for realizing the process 60.

In one example, the UL transmission comprises at least one SRS. In one example, the indicator is a SRS resource indicator or a precoder set indicator. For example, a state in the SRS resource indicator is corresponding to a spatial domain Tx filter. For example, a state in the precoder set indicator is associated with at least one precoding matrix indicator (PMI).

In one example, the communication device receives a SRS configuration comprising the CSI-RS from the network. In one example, the communication device receives a UL grant DCI from the network, and performs the UL transmission to the network according to the UL grant DCI and the precoder. In one example, the UL grant DCI indicates (e.g., includes) a UL resource for performing the UL transmission. In one example, the UL transmission includes at least one of a PUCCH or a PUSCH.

In one example, the communication device operates in a TDD mode. That is, the communication device performs the process 60 and the above examples in the TDD mode.

In one example, the communication device may be configured with a precoder configuration, wherein the precoder configuration may include at least one precoder set, and each precoder set may include at least one of following information: at least one precoder, a precoder index and an index offset. For example, the communication device may be configured with an index offset and a first precoder index, which may implies that a second precoder index equals to the first precoder index plus the index offset. In this case, the precoder set may include precoder indices between the first precoder index and the second precoder index. For example, the communication device may be configured with a first precoder index and a second precoder index. In this case, the precoder set may include precoder indices between the first precoder index and the second precoder index.

It should be noted that a precoder index may be included in at least one precoder set. For example, among the n-th precoder set and the (n+1)-th precoder set, there are a m-th precoder index, a (m+1)-th precoder index and a (m+2)-th precoder index. In this case, the n-th precoder set may include the m-th precoder index and the (m+1)-th precoder index, and the (n+1)-th precoder set may include the (m+1)-th precoder index and the (m+2)-th precoder index, where the (m+1)-th precoder index is included in both the n-th precoder set and the (n+1)-th precoder set. In one example, each precoder and/or precoder set in the precoder configuration is predetermined or is fixed (e.g., in the specification).

Figure 7:
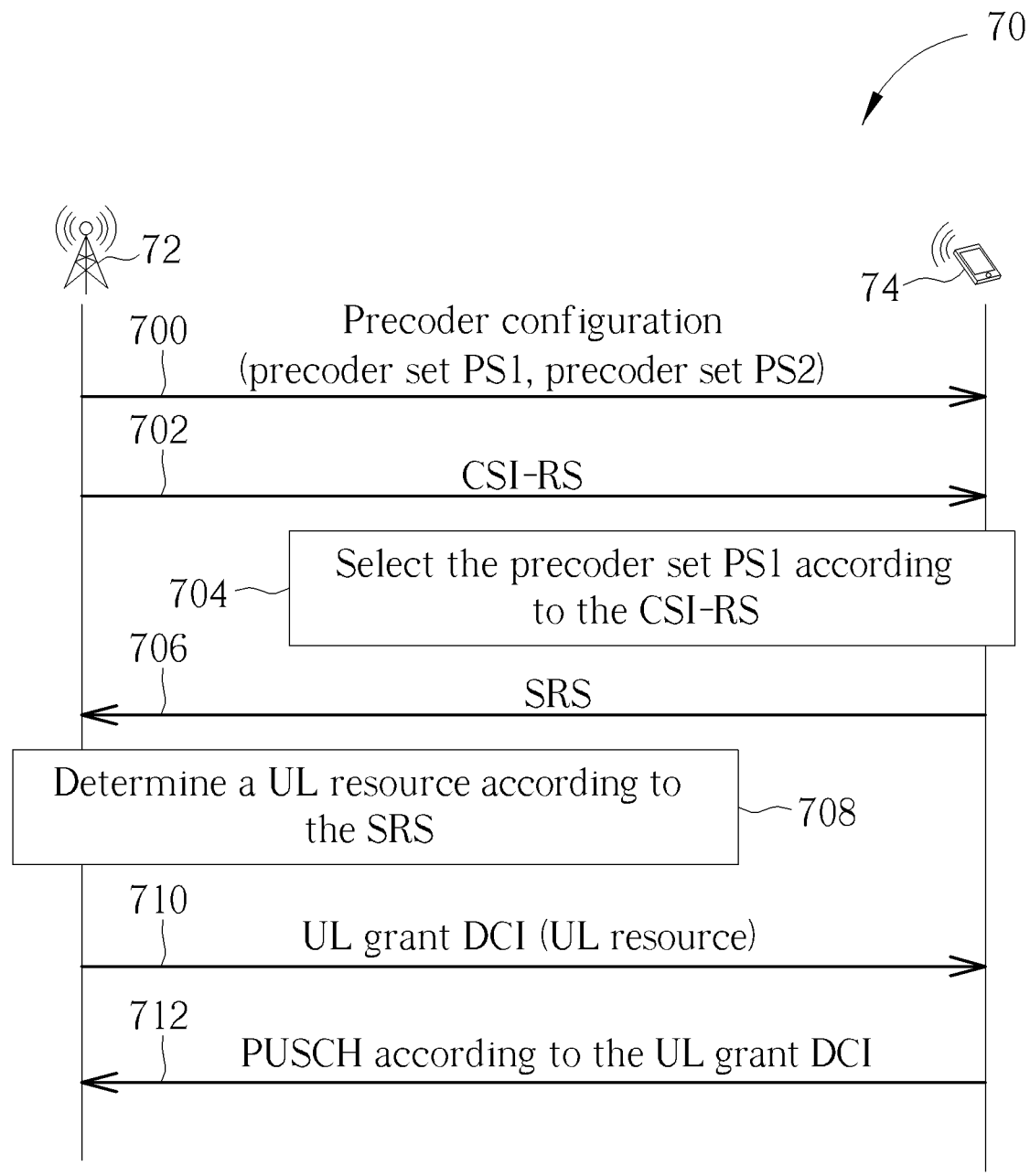
FIG. 7 is a flowchart of a process according to an example of the present invention.

FIG. 7 is a flowchart of a process 70 according to an example of the present invention. A gNB 72 communicates with a communication device 74 according to a beamforming. The gNB 72 transmits a precoder configuration including precoder sets PS1-PS2 to the communication device 74 (Step 700). The precoder set PS1 may include precoders P1-P4, and the precoder set PS2 may include precoders P5-P8. The gNB 72 transmits a CSI-RS to the communication device 74 (Step 702). The communication device 74 selects the precoder set PS1 from the precoder sets PS1-PS2 according to the CSI-RS (Step 704). The communication device 74 transmits a SRS with the precoder set PS1 (i.e., according to the precoders P1-P4) to the gNB 72 according (Step 706). The gNB 72 determines a UL resource for a PUSCH (or PUCCH) according to the SRS (Step 708). The gNB 72 transmits a UL grant DCI indicating the UL resource to the communication device 74 (Step 710). The communication device 74 transmits the PUSCH to the gNB 72 via the UL resource according to the UL grant DCI (Step 712).

In the above examples, a beam may be replaced by an antenna, an antenna port, an antenna element, a group of antennas, a group of antenna ports, a group of antenna elements, a spatial domain filter, a reference signal resource, but is not limited herein. For example, a first beam may be represented by a first antenna port, a first group of antenna ports or a first spatial domain filter.

In the above examples, the network may be replaced by a cell, a serving cell, a transmission reception point (TRP), an unlicensed cell, an unlicensed serving cell, an unlicensed TRP, a gNB, an eNB, but is not limited herein.

In the above examples, a precoder may be replaced by a beamforming weight, a digital beamforming, an analog beamforming, a hybrid beamforming, but is not limited herein.

In the above examples, a spatial Tx filter may be replaced by a Tx beam, a spatial Tx parameter, a spatial domain transmission filter, but is not limited herein.

The operation of "determine" described above may be replaced by the operation of "compute", "calculate", "obtain", "generate", "output", "use", "choose/select" or "decide". The term of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and method for handling a SRS. Operations to be performed by the communication device and the network are defined. Thus, the communication device can transmit the SRS without introducing an inter-user interference to other communication devices. As a result, performance of UL MU-MIMO operated by the communication device and the network is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a sounding reference signal (SRS) transmission, comprising:
at least one storage device; and
at least one processing circuit, coupled to the at least one storage device, wherein the at least one storage device stores instructions, and the at least one processing circuit is configured to execute the instructions of:
determining at least one uplink (UL) beamforming weight of at least one SRS according to a first channel state information reference signal (CSI-RS) and a second CSI-RS, wherein the first CSI-RS is for determining the at least one UL beamforming weight and the second CSI-RS is for a channel interference suppression for the at least one SRS; and
transmitting the at least one SRS with the at least one UL beamforming weight to a network according to a beamforming,
wherein the at least one SRS is suppressed according to the at least one UL beamforming weight.

2. The communication device of claim 1, wherein the at least one of SRS is configured by a SRS configuration received from the network, and the SRS configuration comprises the at least one of the first CSI-RS or the second CSI-RS.

3. The communication device of claim 2, wherein the SRS configuration comprises a plurality of trigger states.

4. The communication device of claim 1, wherein the instructions comprise:

receiving the at least one of the first CSI-RS or the second CSI-RS according to a UL RS request related configuration, from the network.

5. The communication device of claim 1, wherein the at least one SRS is determined according to a signaling indicating one of a plurality of trigger states.

6. The communication device of claim 5, wherein the plurality of trigger states comprises at least one of no SRS transmission, determining the at least one UL beamforming weight according to the first CSI-RS, or determining the at least one UL beamforming weight according to the first CSI-RS and the second CSI-RS.

7. The communication device of claim 5, wherein the signaling is a SRS request in a UL grant downlink (DL) control information (DCI).

8. The communication device of claim 7, wherein the instructions comprise:

performing a UL transmission to the network according to the UL grant DCI.

9. The communication device of claim 8, wherein the UL transmission comprises at least one of a physical UL control channel (PUCCH) or a physical UL shared channel (PUSCH).

10. The communication device of claim 1, wherein the at least one SRS is at least one periodic SRS or at least one aperiodic SRS.

11. The communication device of claim 1, wherein the first CSI-RS or the second CSI-RS is selected by a medium access control (MAC) control element (CE).

* * * * *